May 10, 1949.    J. MARTIN    2,469,660
CONTROL OF VARIABLE PITCH AIRSCREW FOR AIRCRAFT
Filed Sept. 16, 1947    4 Sheets-Sheet 2

INVENTOR
JAMES MARTIN
BY *Worth Wade*
ATTORNEY.

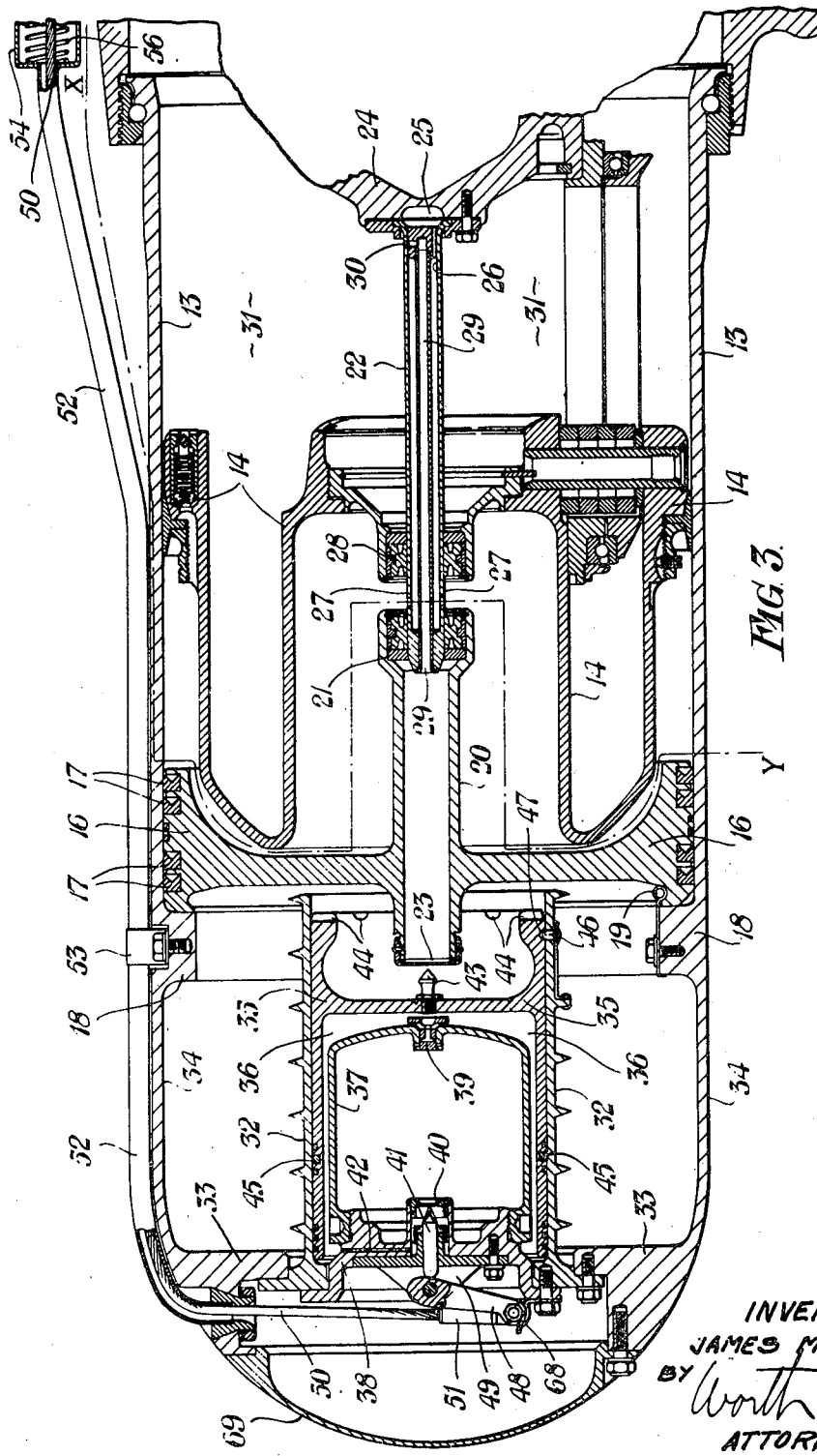

Patented May 10, 1949

2,469,660

UNITED STATES PATENT OFFICE 2,469,660

CONTROL OF VARIABLE PITCH AIRSCREWS FOR AIRCRAFT

James Martin, Higher Denham, near Uxbridge, England

Application September 16, 1947, Serial No. 774,381
In Great Britain October 2, 1946

5 Claims. (Cl. 170—160.32)

This invention relates to variable pitch airscrews for aircraft and is particularly intended for use with multi-engine aeroplanes. The object of the invention is to provide means for feathering the blades of the airscrew of any of the engines which become inoperative or which are not acting to propel the aeroplane at any given time.

When one or more engines of a multi-engined aeroplane become inoperative during flight the airscrew of the inoperative engine or engines will tend to be rotated by the air stream and will thus set up considerable resistance to the travel of the aeroplane and will make it more difficult for the flight of the aeroplane to be maintained by the engines which continue to operate. By providing means for feathering the blades of the airscrews of any engine which ceases to operate, the work which will be thrown upon the other engines will be considerably reduced, thereby enabling the aeroplane to continue in controlled flight on the remaining engines. Emergency hand or automatic control means may be provided for the purpose of bringing the feathering mechanism into action.

According to this invention a supplementary cylinder and piston is provided with a chamber for a self-contained pressure reservoir or an explosive cartridge and mechanism to fire the cartridge or release the compressed gases from the reservoir so that the products of combustion from the explosive cartridge or the compressed gases will operate between the piston and cylinder to move the blades of the airscrew to the feathered position.

In order that the invention may be more clearly understood a detail description will now be given of two methods of applying the invention to an existing known type of variable pitch airscrew, with reference to the accompanying drawings in which:

Fig. 3 is a longitudinal section of the control mechanism in the extended hub cap of the airscrew as shown in Fig. 1 but to a somewhat larger scale.

Figure 1:
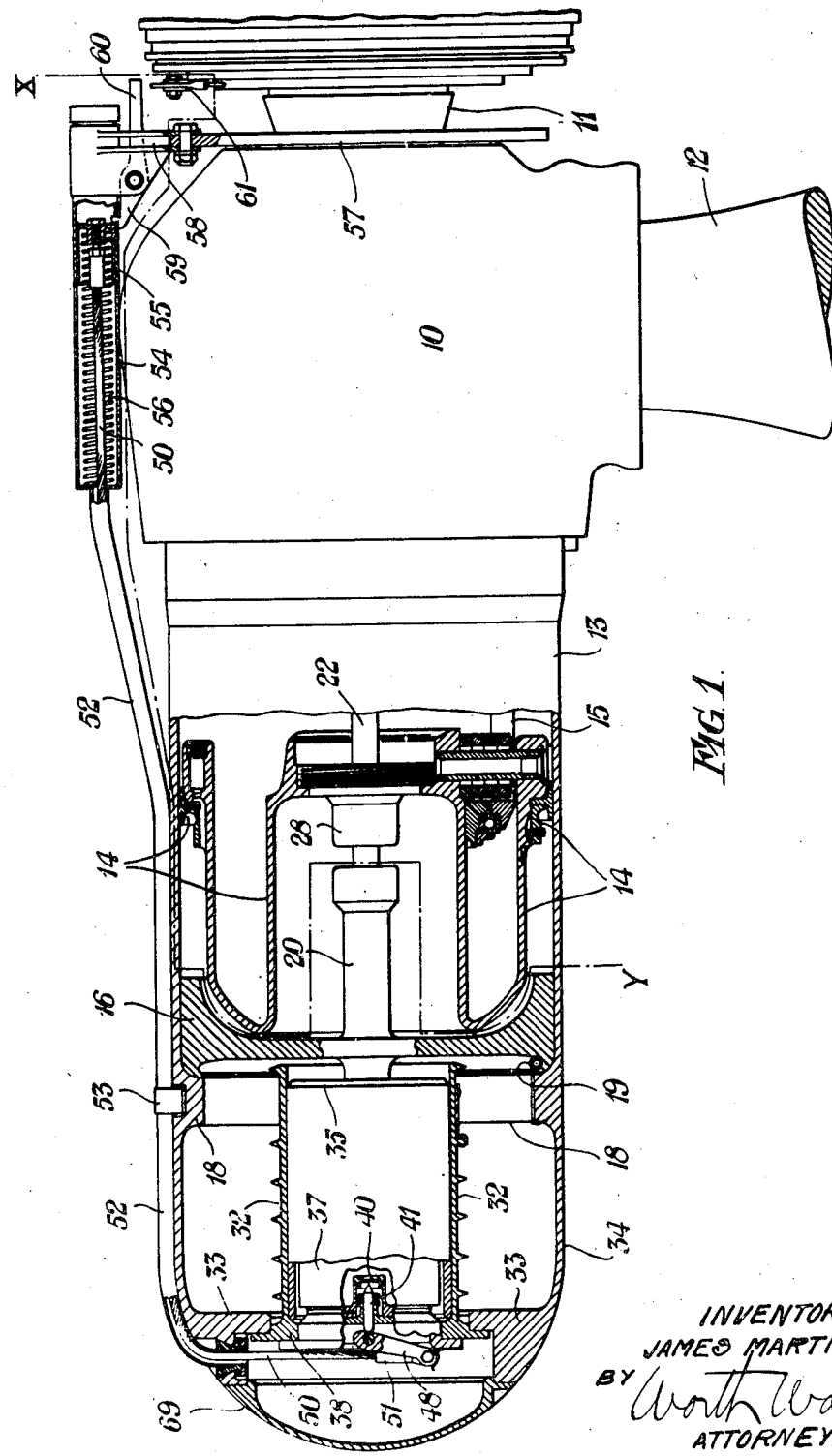
Fig. 1 is a longitudinal section through the hub of a variable pitch airscrew for an aeroplane and having the control mechanism embodied in an extended hub cap of the airscrew.

Referring to Figs. 1 to 4 of the drawings, these illustrate the method of carrying the invention into practice in which a self-contained reservoir of pressure fluid is used for actuating the control mechanism. The airscrew hub 10 is secured to the engine shaft 11 in the usual manner and 12 represents the root of one of the airscrew blades which are arranged at equal intervals round the hub 10 and are adapted to be turned about their axes for the purpose of varying the pitch of the air-screw and for braking. The drawings illustrate a well known type of variable pitch airscrew in which the control mechanism is located in a hub cap 13 secured to the front of the airscrew hub 12. The hub cap 13 acts as a cylinder for the normal control piston 14 which may be made to slide therein by pumping oil or other suitable liquid to either side of the piston. For example, oil may be pumped to the engine side of this piston to govern the constant speed pitch control of the airscrew or for braking requirements and oil may be pumped to the other side of the piston 14 for normal feathering by turning the airscrew blades into a neutral position in which they will not be caused to rotate by the air as the aeroplane travels in normal flight. The present invention comprises the control mechanism embodied in the extended outer end of the hub cap 13. This mechanism is mainly situated to the left of and outside the dot and dash line X—Y shown in Fig. 1.

The normal control mechanism is well known and not being a part of this invention need not be described in detail but the piston 14 is connected by a series of actuating links 15 to the means for turning the airscrew blades about their axes. One such link may be provided for each blade (only one being shown in Fig. 1 of the drawings).

Figure 4:
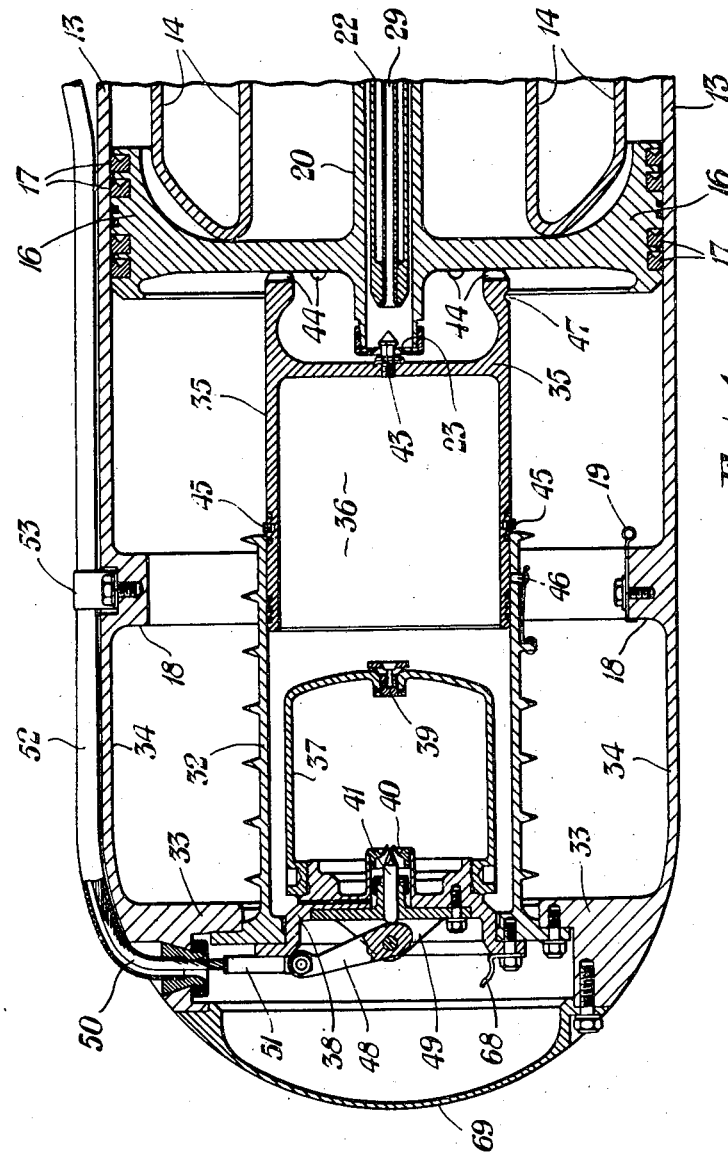
Fig. 4 is a similar view to Fig. 3 but showing the mechanism after the control has been brought into operation.

In the cylinder formed by the hub cap 13 is provided the supplementary feathering piston 16 see Figs. 1, 3 and 4. In Figs. 3 and 4, this piston is shown with packing rings 17 but in Fig. 1 details are omitted on account of the small scale. This supplementary piston 16 is normally retained against the internal flange 18 of the hub cap 13 by means of at least one spring clip 19. When more than one clip 19 is provided these are distributed at equal intervals round the flange 18. The piston 16 has a hollow tubular shank 20 having a packing gland 21 at its inner end which engages over and is adapted to slide on the stationary tube 22 (see Fig. 3). The other end of the hollow shank 20 is sealed by means of a diaphragm 23 adapted to be perforated when the feathering mechanism of the present invention comes into operation. The tube 22 is supported on the base 24 and oil under pressure is supplied by the normal feathering pump through the passage 25 and 26 to the outlets 27 situated between the packing gland 21 of the hollow tubular shank 20 and a packing gland 28 in the normal control piston 14. The inner tube 29 communicates through an aperture 30 near its base with the space 31 at the right hand end of the normal control piston 14. It will thus serve as a vent to release any fluid in the space 31 when the diaphragm 23 is perforated.

The means for operating the feathering mechanism according to this invention as shown in Figs. 1, 3 and 4 comprise the cylinder 32 bolted to the flange 33 of the extended end 34 of the hub cap 13. Slidably mounted in the cylinder 32 is a piston 35 having a deep recess 36 in its outer end. Located in the recess 36, but clear of the walls of the piston 35, is the pressure reservoir 37 supported on its flanged cover plate 38. The reservoir is provided with a filling aperture having a sealing valve 39 through which it may be charged with highly compressed gaseous fluid such as carbon-dioxide gas compressed to a suitable pressure. The pressure reservoir is hermetically sealed and in its cover plate 38 is provided a diaphragm 40. A pointed pin 41 is mounted in the cover plate 38 and may be actuated to perforate the diaphragm 40 to release the pressure fluid in the reservoir 38 which passes through at least one passage 42 to the recess 36 in the outer end of the piston 35 and will force it to move inwardly toward the hub of the airscrew. The pointed striker 43 on the piston 35 will pierce the diaphragm 23 in the end of the hollow tubular shank 20 to release fluid trapped in the space 31. This puts the normal control mechanism out of operation. Continued movement of the piston 35 will cause its end to contact the supplementary feathering piston 16. Grooves 44 are formed in the end of the piston 35 to provide a free passage for fluid escaping through the perforated diaphragm 23. The supplementary feathering piston 16 will then be pressed against the normal control piston 14 and the whole will continue to move toward the hub until the blades of the airscrew are moved to the fully feathered position. At this position which is shown in Fig. 4, a piston ring 45 in a groove on the piston 35 will have passed out of the end of the cylinder 32 and will expand sufficiently to prevent the piston being pushed back into the cylinder 32. The airscrew blades will thus be locked in the fully feathered position. A spring supported peg 46 normally engages in a recess 47 in the piston 35 to retain it in the position shown in Fig. 3.

Automatic means may be provided for actuating the pointed pin 41 to release the compressed gases from the pressure reservoir 37 when a predetermined set of conditions arise but it is preferred to rely upon hand control so that the pilot may exercise his own judgment as to when to bring the control mechanism into operation. For this purpose a cam lever 48 is pivoted in brackets 49 on the cover plate 38 and one end of an operating cable 50 is connected to this cam lever by a shackle 51. The operating cable 50 is enclosed in a tubular duct 52 secured to the hub cap by a clip 53. The other end of the tubular duct is connected to a housing 54 in which is mounted a plunger 55 to which is connected the end of the operating cable 50 and a spring 56 tends to move the plunger so as to exert a considerable pull on the cable 50. The housing 54 is mounted on a flange 57 of the hub 10 by the bracket 58 so as to rotate with the airscrew hub. Mounted on the housing 54 is a pivoted sear 59 the forward end of which is adapted to engage the plunger 55 to hold it in its forward position against the action of the spring 56 as shown in Fig. 1 in which the cam lever 48 is set in the cocked position ready to be pulled over by the spring 56 acting on the plunger 55 and the cable 50. The tail end 60 of the pivoted sear extends toward the engine and rotates in an orbit adjacent to a movable cam device adapted to be moved into its path.

Figure 2:
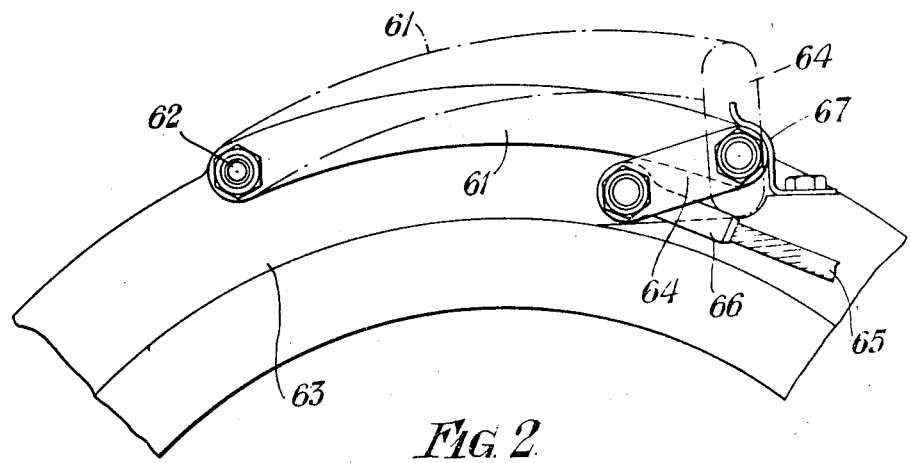
Fig. 2 is a detail showing a cam device for actuating the control mechanism.

A movable cam device is shown in Fig. 2 and comprises an arcuate cam plate 61 pivoted at 62 to a fixed portion of the engine casing 63. To the other end of the cam plate 61 is pivoted a link 64 to which an operating cable 65 is connected by a shackle 66. The cam plate is normally retained in the retracted position by the spring clip 67. The cable 65 is connected to a manually controlled lever arranged near the pilot or engineer of the aeroplane. When this control lever is operated, the cam plate 61 will be moved to the position shown by the dot and dash lines in Fig. 2 and will project into the path of the rotating tail end 60 of the lever 59. The lever will be turned about its pivot to withdraw the sear and release the plunger 55. The spring 56 will pull on the cable 50. This will turn the cam lever 48 about its pivot and will force the pointed pin 41 through the diaphragm 40 to release the compressed gases from the pressure reservoir 37. These will operate the control mechanism in the manner described above and will move the airscrew blades to the fully feathered position in which they may be locked. The cam lever 48 may normally be held in the cocked position shown in Fig. 3 by means of the spring clip 68. A detachable cover 69 is provided on the end 34 of the hub cap 13 to give access to the mechanism for resetting after use and for replacing the pressure reservoir and for other adjustments or replacements.

Figure 5:
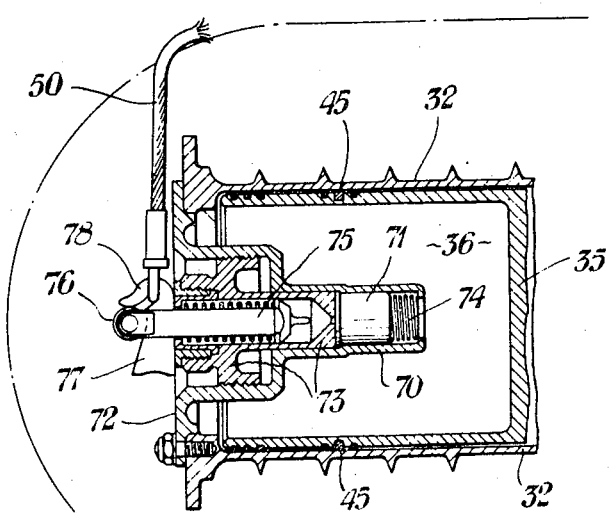
Fig. 5 shows a modified form of pressure chamber with an explosive cartridge and firing mechanism for providing the necessary pressure for actuating the control mechanism.

The modifications according to the second method of applying the invention are illustrated in Fig. 5. In this arrangement a firing chamber 70 for an explosive cartridge 71 is mounted on the cover plate 72 of the cylinder 32 and a removable breech block 73 is provided to enable a cartridge to be inserted into the firing chamber and to permit a spent cartridge case to be removed. A spring 74 may be provided in the firing chamber to assist in ejecting the spent cartridge case. Mounted in the breech block 73 is a spring loaded firing pin 75, the outer end of which is slotted and supports a roller abutment 76. A wedge-shaped sear 77 engages in the slotted end of the firing pin 75 and the roller abutment rests on the inclined edge of the sear 77. The cable 50 is provided with a loop which engages the hook 78 on the end of the sear 77. When a pull is exerted on the cable 50 it will pull out the sear 77 causing the roller abutment 76 to ride up the inclined edge of the sear until the sear is completely withdrawn. This first compresses the spring and cocks the firing pin and then releases the firing pin to strike the cap of the cartridge and fire the charge. The products of combustion discharge into the recessed end 36 of the piston 35 which forms an expansion chamber for the gases which act to move the piston 35 and the control mechanism in the manner already described in connection with Figs. 1, 3 and 4.

This invention provides simple and reliable means for controlling a variable pitch airscrew actuated by a self-contained source of pressure, operating and controlled independently of the normal control for varying the pitch of the airscrew blades. When an engine or airscrew of a multi-engine aeroplane is inoperative or damaged, the invention may be brought into operation to move the airscrew blades to the fully feathered position so as to avoid further rotation of the engine and airscrew and to minimise the resistance set up by the airscrew of the inoperative engine. The invention also acts to put out of operation the normal pitch control mechanism of the airscrew to ensure rapid and effective setting of the airscrew blades to the fully feathered position. This is important, as continuous rotation of a damaged engine may cause it to catch fire or break up the engine or the airscrew or its driving gear with disastrous results to the aircraft which might otherwise continue to fly safely on its remaining serviceable engines.

I claim:

1. Supplemental mechanism for emergency feathering of the blades of a variable pitch airscrew of the type utilizing fluid pressure to normally actuate a blade-control piston in a fluid chamber mounted in the hub-cap of the airscrew, said supplemental mechanism comprising, in combination with said airscrew, of an extension on said hub-cap forming a housing, a cylinder mounted in said housing, a hollow piston slidably mounted in said cylinder and forming therewith an enclosed space, a self-contained pressure reservoir positioned in said space, means on said extension to release fluid from said reservoir into said space to actuate said hollow piston, and means actuated by the movement of said hollow piston to release fluid pressure acting upon the normal blade-control piston of the airscrew.

2. A supplemental airscrew control mechanism as recited in claim 1, in which the pressure-releasing means on said self-contained pressure reservoir comprises a flexible cable, a cam mounted on said extension of said hub-cap and attached to one end of the cable, a pin having a pointed end arranged and positioned to release pressure from said reservoir and having the other end bearing against said cam whereby it is actuated by movement of said cam, and means actuated by the rotation of said airscrew to exert tension on the other end of said cable to move said cam.

3. A supplemental airscrew control mechanism as recited in claim 1, in which the self-contained pressure reservoir is a closed container having a compressed fluid sealed therein.

4. A supplemental airscrew control mechanism as recited in claim 1, in which the self-contained pressure reservoir is an explosive cartridge.

5. A supplemental airscrew control mechanism as recited in claim 1, in which the means to release fluid pressure acting upon the normal blade-control piston comprises a cylinder having one end open to said fluid pressure and the other end closed by a diaphragm, and a sharp-pointed plunger arranged and positioned to puncture said diaphragm, said plunger being mounted on the closed end of said hollow piston.

JAMES MARTIN.

REFERENCES CITED

The following references are of record in the file of this patent:

UNITED STATES PATENTS

| Number | Name | Date |
| --- | --- | --- |
| 2,226,316 | Martin | Dec. 24, 1940 |
| 2,391,699 | Haines et al. | Dec. 25, 1945 |
| 2,417,870 | Haines | Mar. 25, 1947 |
| 2,424,749 | Haines | July 29, 1947 |